United States Patent
Balachandran et al.

(10) Patent No.: US 11,977,483 B2
(45) Date of Patent: May 7, 2024

(54) MAINTAINING DATA IN A FIRST LEVEL MEMORY AND BUCKETS REPRESENTING REGIONS OF MEMORY DEVICES TO EXTEND DATA CACHE

(71) Applicant: INTERNATIONAL BUSINESS MACHINES CORPORATION, Armonk, NY (US)

(72) Inventors: Subashini Balachandran, Sunnyvale, CA (US); Frank Schmuck, Campbell, CA (US); Owen T. Anderson, Bellevue, WA (US); Wayne A. Sawdon, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 324 days.

(21) Appl. No.: 17/238,201

(22) Filed: Apr. 22, 2021

(65) Prior Publication Data
US 2022/0342815 A1 Oct. 27, 2022

(51) Int. Cl.
*G06F 12/06* (2006.01)
*G06F 3/06* (2006.01)

(52) U.S. Cl.
CPC ........ *G06F 12/0684* (2013.01); *G06F 3/0604* (2013.01); *G06F 3/0656* (2013.01); *G06F 3/0673* (2013.01); *G06F 2212/251* (2013.01)

(58) Field of Classification Search
CPC ............................ G06F 12/0684; G06F 3/0604
See application file for complete search history.

(56) References Cited

U.S. PATENT DOCUMENTS

| | | | |
|---|---|---|---|
| 9,141,528 B2 | 9/2015 | Gorobets et al. | |
| 9,183,134 B2* | 11/2015 | Haines | G06F 3/0629 |
| 9,606,734 B2 | 3/2017 | Ioannou et al. | |
| 9,632,927 B2 | 4/2017 | Camp et al. | |
| 9,703,505 B2 | 7/2017 | Boyle et al. | |
| 9,760,493 B1* | 9/2017 | Wang | G06F 12/127 |

(Continued)

OTHER PUBLICATIONS

W. Xie, W., et al., "A Low-cost Adaptive Data Separation Method for the Flash Translation Layer of Solid State Drives", In Proceedings of the 2015 International Workshop on Data-Intensive Scalable Computing Systems, Nov. 2015. (pp. 1-8).

(Continued)

*Primary Examiner* — Baboucarr Faal
(74) *Attorney, Agent, or Firm* — KONRAD, RAYNES, DAVDA & VICTOR LLP; David W. Victor

(57) ABSTRACT

Provided are a computer program product, integrated cache manager, and method for maintaining data in a first level memory and buckets representing regions of memory devices to extend data cache. A plurality of buckets represent distinct regions of memory devices. The buckets are associated with different threshold access count ranges. Data having an access count is stored in one of the buckets associated with a threshold access count range including the access count of the data to store. Data evicted from a first level memory is copied to an initial bucket comprising one of the buckets. Data is moved from a source bucket comprising one of the buckets, including the initial bucket, to a target bucket of the buckets having a target threshold access count range including an access count of the data to move.

20 Claims, 8 Drawing Sheets

(56) References Cited

U.S. PATENT DOCUMENTS 9,817,766 B1 11/2017 Si et al.
2016/0342509 A1* 11/2016 Kotte .................. G06F 12/0246
2020/0409856 A1* 12/2020 Navon .................. G06F 12/123

OTHER PUBLICATIONS

W. H. Kang, et al., "Flash as cache extension for online transactional workloads", The VLDB Journal, 25(5), 2016, pp. 673-694.

P. Li, et al., "Beating OPT with statistical clairvoyance and variable size caching", In Proceedings of the Twenty-Fourth International Conference on Architectural Support for Programming Languages and Operating Systems, Apr. 2019, (pp. 243-256).

N. Meggido, et al., "ARC: A Self-Tuning, Lowoverhead Replacement Cache", USENIX Association, Proceedings of FAST '03:2nd USENIX Conference on File and Storage Technologies, San Francisco, CA, Mar. 31-Apr. 2, 2003, pp. 17, [online][retrieved Feb. 26, 2021] https://www.usenix.org/legacy/events/fast03/tech/full_papers/megiddo/megiddo.pdf.

* cited by examiner

MAINTAINING DATA IN A FIRST LEVEL MEMORY AND BUCKETS REPRESENTING REGIONS OF MEMORY DEVICES TO EXTEND DATA CACHE

BACKGROUND OF THE INVENTION

1. Field of the Invention

The present invention relates to a computer program product, integrated cache manager, and method for maintaining data in a first level memory and buckets representing regions of memory devices to extend data cache.

2. Description of the Related Art

A storage subsystem may utilize low latency Dynamic Random Access Memory (DRAM) and one or more higher latency flash NAND memory devices, which are less expensive than DRAM, to provide greater storage in the memory or cache at a lower cost by using higher latency, lower cost NAND devices, or flash memory. This allows the storage sub-system memory to be expanded with fast access non-volatile memory NAND devices.

In current deployments of flash memory devices as a second level memory to a first level memory, such as DRAM, the flash memory is used as a paging device for virtual memory managed by the operating system. In another use of flash memory, the flash memory may be managed as a second memory pool using cache replacement algorithms.

There is a need in the art for improved techniques for managing data in a first level memory, such as a DRAM, and second level memories comprising higher latency devices, such as flash memory NAND devices

SUMMARY

Provided are a computer program product, integrated cache manager, and method for maintaining data in a first level memory and buckets representing regions of memory devices to extend data cache. A plurality of buckets represent distinct regions of memory devices. The buckets are associated with different threshold access count ranges. Data having an access count is stored in one of the buckets associated with a threshold access count range including the access count of the data to store. Data evicted from a first level memory is copied to an initial bucket comprising one of the buckets. Data is moved from a source bucket comprising one of the buckets, including the initial bucket, to a target bucket of the buckets having a target threshold access count range including an access count of the data to move.

DETAILED DESCRIPTION

Figure 1:
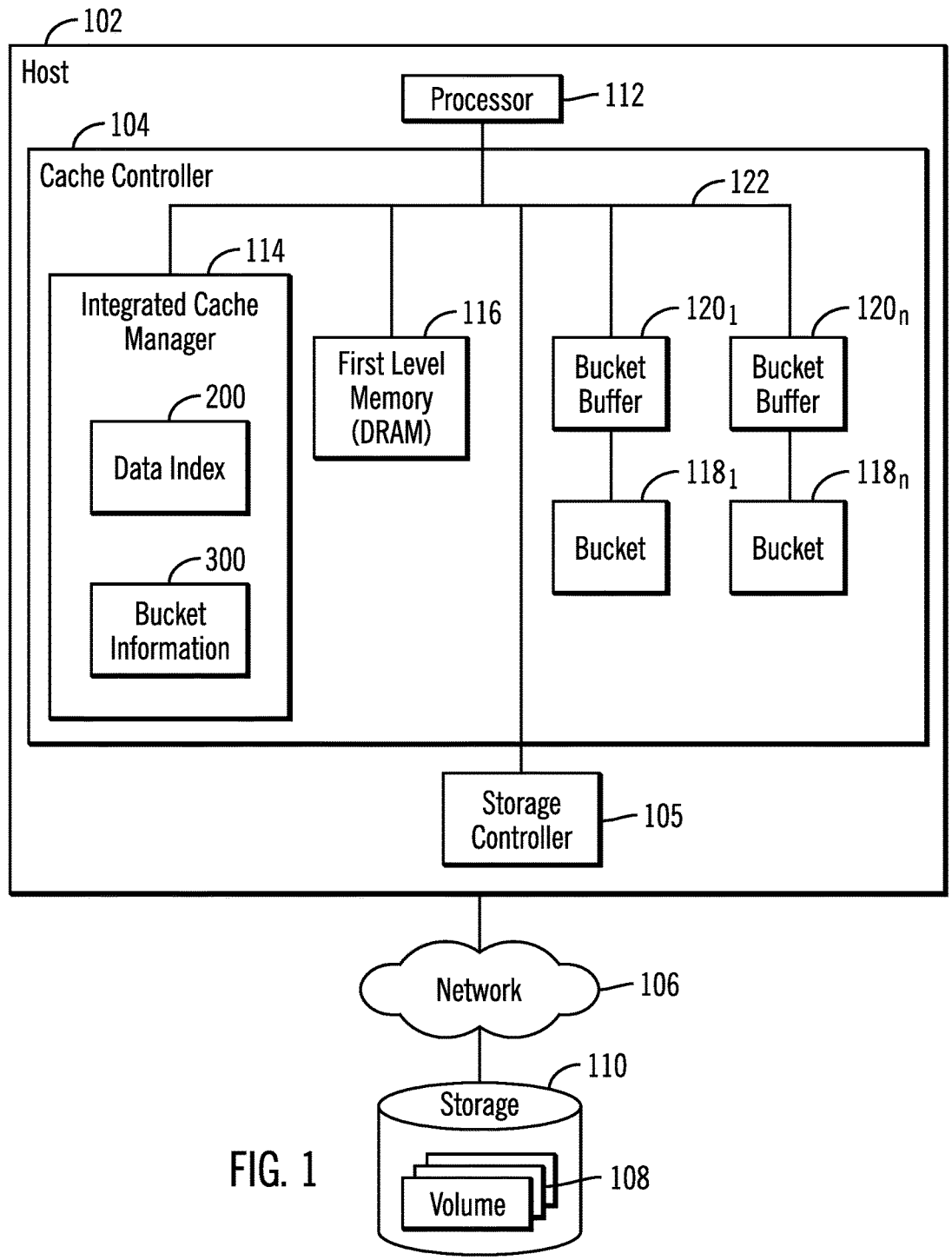
FIG. 1 illustrates an embodiment of a computing environment with a memory subsystem having a plurality of memory devices.

Current systems that use a NAND flash memory device as a second level memory for data evicted from a higher performance first level memory, e.g., DRAM, may experience performance problems because the flash memory cannot efficiently process small random writes, such as 4K writes, from the first level DRAM memory. With flash memory, data cannot be overwritten in place, and new writes must be written to a new block which requires a garbage collection process to move existing data in blocks to a new block with the new data write to consolidate the new small data write in a block with other data. Handling numerous small writes at the first level memory compounds the performance problem delays by having to continually perform a garbage collection process for each small write received.

Described embodiments provide improved computer technology for caching data from a first level memory, e.g., DRAM memory, which has low latency but relatively expensive, in less expensive second level memory devices, such NAND flash memory, which has higher latency than the first level memory, e.g., DRAM. Flash memory is cheaper and uses less power than DRAM and provides much lower latency storage than the underlying storage system in which data is stored.

Described embodiments improve the performance of writing data from the first level memory, e.g., DRAM, to the second level memory, e.g., NAND flash memory, by organizing the flash memory into distinct regions of the flash memory device referred to as buckets. Each bucket, i.e., region of memory, may be associated with a separate buffer, such as a separate RAM buffer electrically coupled to the bucket region, to buffer received data evicted from the first level memory. Smaller writes from the first level memory may be aggregated into a larger object in the buffer for the bucket. These larger objects formed in a buffer may then be sequentially written to the corresponding bucket of the second level memory. In this way, write performance in the second level NAND memory is improved by consolidating small writes into a larger object to sequentially write as a single object to avoid having to perform garbage collection for each small write from the first level memory device.

Described embodiments may implement each bucket of memory as a circular buffer or log structured array, where the data objects of aggregated data to cache are written as sequential writes to the bucket memory. Further, access counts are maintained for the data in the bucket memories so that the bucket memories cache "hotter" data that is more frequently accessed and has higher access counts. In this way, the buckets are associated with threshold access count ranges to store data having access counts maintained by that bucket. Buckets storing hotter, or more frequently accessed data, would have a higher threshold access count range than buckets storing less frequently accessed data. The use of buckets with increasing threshold access count ranges allows data that is frequently accessed to be maintained in the bucket memories longer to be available to return to read requests.

FIG. 1 illustrates an embodiment of a computing environment. A plurality of hosts 102 may each include a cache controller 104 to cache data retrieved from a storage 110 over a network 106, stored in volumes 108 (e.g., Logical Unit Numbers, Logical Devices, Logical Subsystems, etc.) in the storage 110. The host 102 further includes a storage controller 105 to perform read and write requests with respect to the volumes 108 in the storage 110, and access the data to cache at the cache controller 104. The host 102 includes one or more processors 112 coupled to the cache controller 104. The cache controller 104 implements a memory subsystem, such as a storage class memory (SCM) memory system, having an integrated cache manager 114 and data index 200 to manage the placement of data, such as blocks or tracks, in one of a plurality memory devices, such as a first level memory device 116 and one of multiple buckets $118_1 \ldots 118_n$ comprising distinct regions of physical memory devices. The buckets $118_1 \ldots 118_n$ may each have a bucket buffer $120_1 \ldots 120_n$ to buffer data to aggregate into larger data objects before writing to the associated bucket $118_1 \ldots 118_n$. This allows smaller, randomly written data, to be aggregated into a large data object to sequentially write to the bucket $118_i$ memory. The integrated cache manager 114 may also maintain address translation tables to provide translation services and map tracks in the volumes 108 to physical or logical locations in the memories 116, $118_1 \ldots 118_n$.

The processor 112, integrated cache manager 114, memory devices 116, $118_1 \ldots 118_n$, and storage controller 105 may communicate over one or more bus interfaces 122. Further, the integrated cache manager 114 may communicate over different types and separate bus and device interfaces for different of the memory devices 116, $118_1 \ldots 118_n$. For instance, a local memory interface may be used to communicate with the first level memory device 116, such as for a DRAM, and a storage device interface may be used to communicate with the buckets comprising lower level memory devices, such as Non-Volatile Memory Express (NVME) to communicate with flash memory and SSDs.

In one embodiment, the first level memory 116 may comprise a high cost and very low latency device such as a Dynamic Random Access Memory (DRAM) or Static Random Access Memory (SRAM), and the buckets $118_1 \ldots 118_n$ may comprise lower level memory devices that are less expensive and have higher latency and higher storage capacity than DRAM, such as non-volatile random access memory (NVRAM), including Magnetoresistive Random Access Memory (MRAM), Phase Change Memory (PCM), Resistive Random Access Memory (RRAM), spin transfer torque memory (STM-RAM), conductive bridging RAM (CBRAM), NAND memory devices, such as flash memory and solid state drives (SSDs), etc. In one embodiment, the lower level memory devices in which the buckets $118_1 \ldots 118_n$ are implemented may have different endurance profiles with different number of available erase cycles, such that higher level of the memory devices implementing buckets $118_1 \ldots 118_n$ allow for a greater number of erase cycles, i.e., greater endurance, than the lower level of the memory devices implementing buckets $118_1 \ldots 118_n$.

The bucket buffers $120_1 \ldots 120_n$ may be implemented in separate memory devices from the memory devices implementing the buckets $118_1 \ldots 118_n$. In certain embodiments, the bucket buffers $120_1 \ldots 120_n$ may comprise separate RAM buffers in one or more separate memory devices from the devices implementing the buckets $118_1 \ldots 118_n$. The bucket buffers $120_1 \ldots 120_n$ may be electrically coupled to their corresponding buckets $118_1 \ldots 118_n$ via the bus interface 122 or other connections.

In one embodiment, each of the buckets $118_1 \ldots 118_n$ may be implemented in separate physical memory devices, such as separate flash memory or NAND devices. In an alternative embodiment, some or all of the buckets $118_1 \ldots 118_n$ may be implemented in defined memory regions of the same one or more physical devices, such as map to different virtual memory device comprising regions of same physical memory devices. Further details on the mapping of buckets $118_1 \ldots 118_n$ to physical memory devices is described below with respect to FIGS. 10 and 11.

The integrated cache manager 114 may comprise a separate processing or hardware device implemented as microcode or firmware in hardware devices in the cache controller 104, such as in Application Specific Integrated Circuits (ASICs). Alternatively, the integrated cache manager 114 may comprise a system having a processor executing code loaded into a memory device. Still further, the integrated cache manager 114 may be implemented as code loaded into the first level memory device 116 and executed by the processor 112.

The storage 110 may comprise one or more storage devices known in the art, such as a solid state storage device (SSD), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The network 106 may comprise a Storage Area Network (SAN), a Local Area Network (LAN), a Wide Area Network (WAN), the Internet, and Intranet, etc. Alternatively, the hosts 102 may connect to the cache controller 104 over a bus interface, such as a Peripheral Component Interconnect (PCI) bus interface and other interfaces known in the art.

In one embodiment, the cache controller 104 and storage controller 105 implemented in a host node 102 may comprise blade servers in a host 102 server chassis or comprise separate rack servers or server boxes that communicate over a local network or are implemented on a PCI card and communicate over a bus interface.

Figure 2:
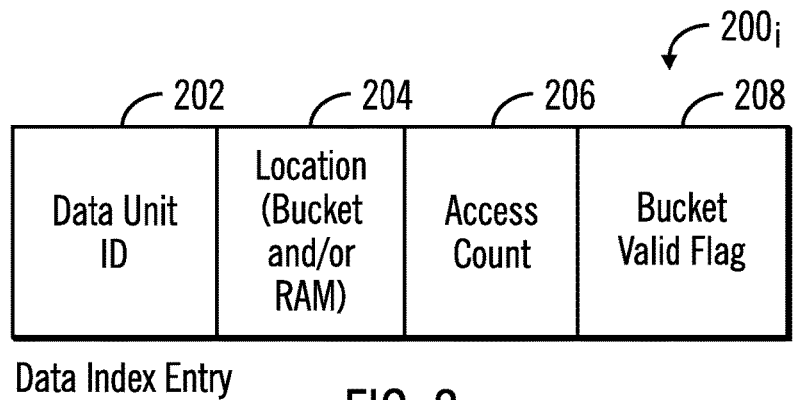
FIG. 2 illustrates an embodiment of a data index entry in a data index providing information on a location of data in memory devices.

FIG. 2 illustrates an embodiment of a data index entry $200_i$ in the index 200 for data, such as blocks, tracks, etc., in the memory 116 and/or buckets $118_1 \ldots 118_n$, and includes a data unit identifier (ID) 202, such as a track ID, logical block unit (LBU), etc.; a location 204, which may be in the memory 116 and/or one of the buckets $118_1 \ldots 118_n$ or bucket buffer $120_1 \ldots 120_n$; an access count 206 indicating a number of read accesses to the data unit 202 while the data 202 is in the memory 116 and/or one of the buckets $118_1 \ldots 118_n$; and a bucket valid flag 208 indicating whether the data 202 in a bucket is valid.

Figure 3:
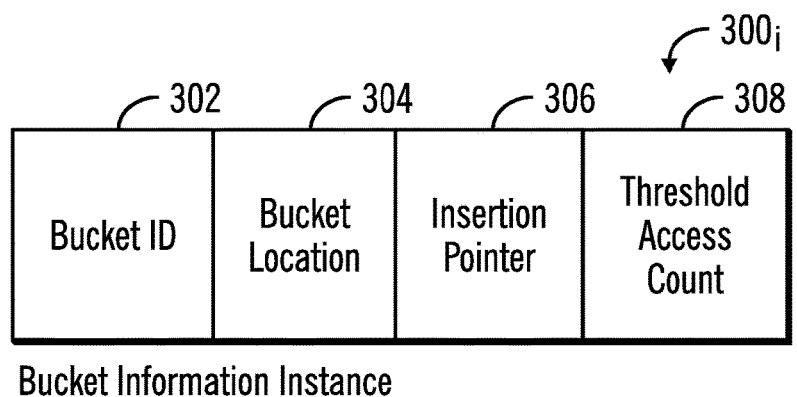
FIG. 3 illustrates an embodiment of bucket information providing information on a bucket mapping to a region of one or memory devices.

FIG. 3 illustrates an embodiment of an instance of bucket information $300_i$ maintained for one of the buckets $118_i$, and includes a bucket identifier (ID) 302, such as a bucket number; a bucket location 304 indicating a location in memory devices implementing a circular buffer in which data is stored in the bucket; an insertion pointer 306 of a last point entry in the circular buffer at which data was added; and a threshold access count 308 for the bucket ID 302. A threshold access range for a bucket $118_i$ extends from the threshold access count 308 of the bucket $118_i$ to the threshold access count 308 of a next bucket $118_{i+1}$ having a next highest threshold access count 308 of the buckets. The last bucket $118_n$ having the highest threshold access count 308 may have no upper range. The threshold access count 308 may comprise an average of the access counts 206 of the data 202 in the bucket 302.

Figure 4:
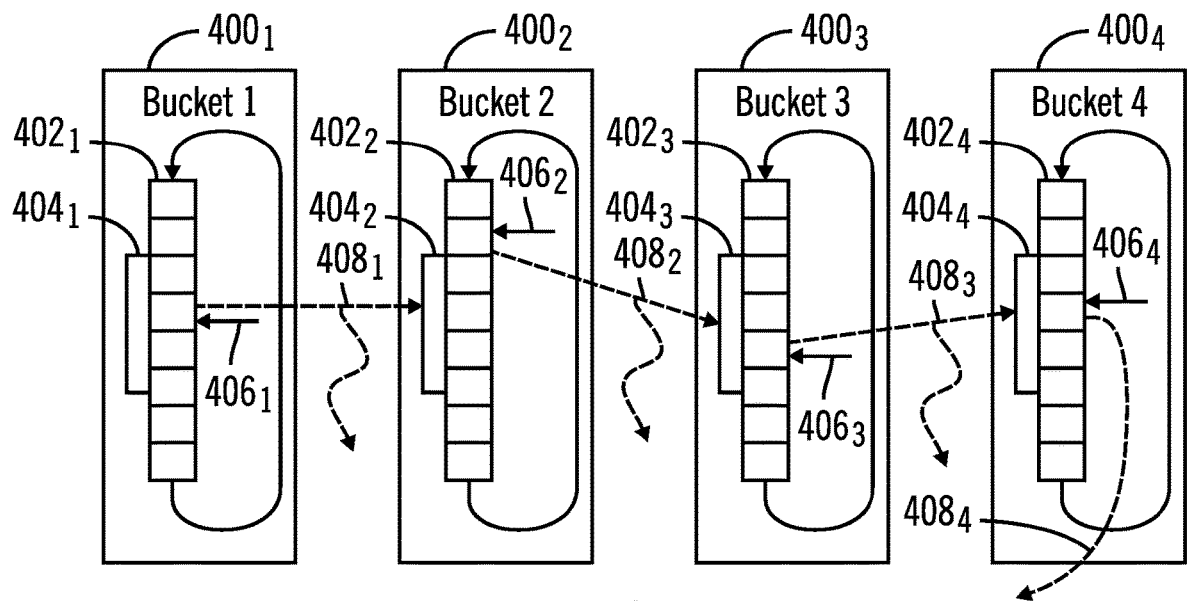
FIG. 4 illustrates an example of buckets of memory regions and data flow between the buckets.

FIG. 4 illustrates an example of the arrangement of the buckets $118_1 \ldots 118_n$ as four buckets $400_1, 400_2, 400_3, 400_4$, each having a circular buffer $402_1, 402_2, 402_3, 402_4$ implementing the bucket and a bucket buffer $404_1, 404_2, 404_3, 404_4$ to buffer data sent to the bucket before being aggregated into data objects to sequentially write to the circular buffer $402_1, 402_2, 402_3, 402_4$. Each of the buckets has an insertion pointer $406_1, 406_2, 406_3, 406_4$ pointing to a last entry in the circular buffer $402_1, 402_2, 402_3, 402_4$ at which to insert data and remove data. The buckets are arranged in ascending order of threshold access count, such that bucket $400_1$ has the lowest threshold access count and is to receive data evicted from the first level memory 116.

The arrows $408_1, 408_2, 408_3, 408_4$ illustrate how data at an entry addressed by the insertion pointer $406_i$ is moved from one bucket $400_i$ to a bucket $400_{i+1}$ with a next highest threshold access count 308 or may be removed from the bucket $400_1$ without being moved to a next bucket $400_{i+1}$ depending on the access count 206 of the data and whether it is high enough to be eligible for a next bucket $400_{i+1}$ with the next higher threshold access count 308. Further, data in the highest bucket $400_4$ having the highest threshold access count 308 may be moved back to the first level memory 116 if its access count 206 is greater than the threshold access count 308. Alternatively, data evicted from one bucket $400_i$ may not just be moved to the next bucket $400_{i+1}$ with the next highest threshold access count 308, but may instead be moved to a bucket having a threshold access range including the data access count 206, which may be a bucket $400_{i+j}$ more than one threshold access count 308 higher than that of the current bucket $400_i$.

Although in FIG. 4, the buckets are implemented as circular buffers, in alternative embodiments, data structures other than a circular buffer may be used to store the data in the buckets.

The below discussion with respect to the buckets and other components may alternatively use the reference numbers in FIGS. 1 and 4 to refer to the bucket elements.

Figure 5:
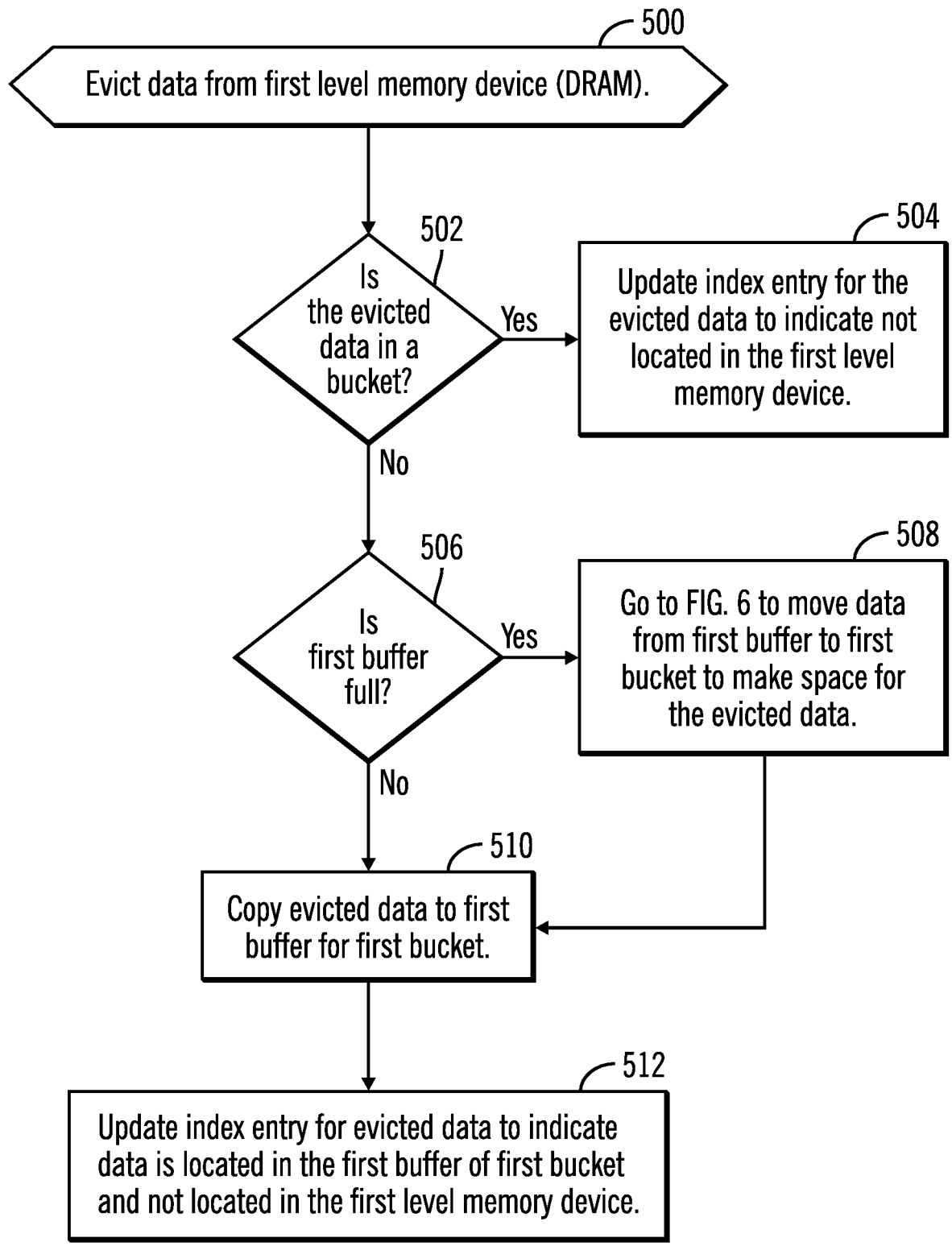
FIG. 5 illustrates an embodiment of operations to evict data from the first level memory and add to a bucket memory.

FIG. 5 illustrates an embodiment of operations performed by the integrated cache manager 114 to evict data from the first level memory device 116. Evicted data may be destaged to storage 110 if having updated data or removed from memory 116 without being destaged to storage 110 if not updated. Upon evicting (at block 500) data from the first level memory device 116, if at (block 502) the evicted data is also stored in a bucket $118_i$, as indicated by the location 204, then the location 204 in the index entry $200_i$ for the data is updated (at block 504) to indicate the data is not located in the first level memory 116, but only the bucket $118_i$. If (at block 502) the evicted data is not also located in a bucket $118_i$, and (at block 506) the first buffer $404_1$ is full, then control proceeds to FIG. 6 to move data from the first buffer $404_1$ to the first circular buffer $402_1$ of the first bucket $400_1$. After freeing space in the buffer $404_1$ (at block 508) or if the first buffer $404_1$ is not full (from the No branch of block 506), the evicted data is copied (at block 510) to the first buffer $404_1$. The index entry $200_i$ for the evicted data is updated (at block 512) to indicate in location field 204 that the data as located in the first buffer $404_1$ of the first bucket $400_1$ and not located in the first level memory device 116.

With the embodiment of FIG. 5, data evicted from the memory 116 may be moved to a lower level bucket memory to be accessible if needed for a read request because returning read requested data from a bucket $400_1$, which may comprise a flash memory, has much lower latency than returning from the storage 110.

In the embodiment of FIG. 5, data is added to the first bucket $118_1, 400_1$ having a lowest threshold access count 308. In alternative embodiments, data evicted from the memory 116 may be added to a bucket $118_i$ associated with a threshold access range including the access count of the evicted data, which may be a bucket other than the first bucket $118_1$ with the lowest threshold access count 308.

Figure 6:
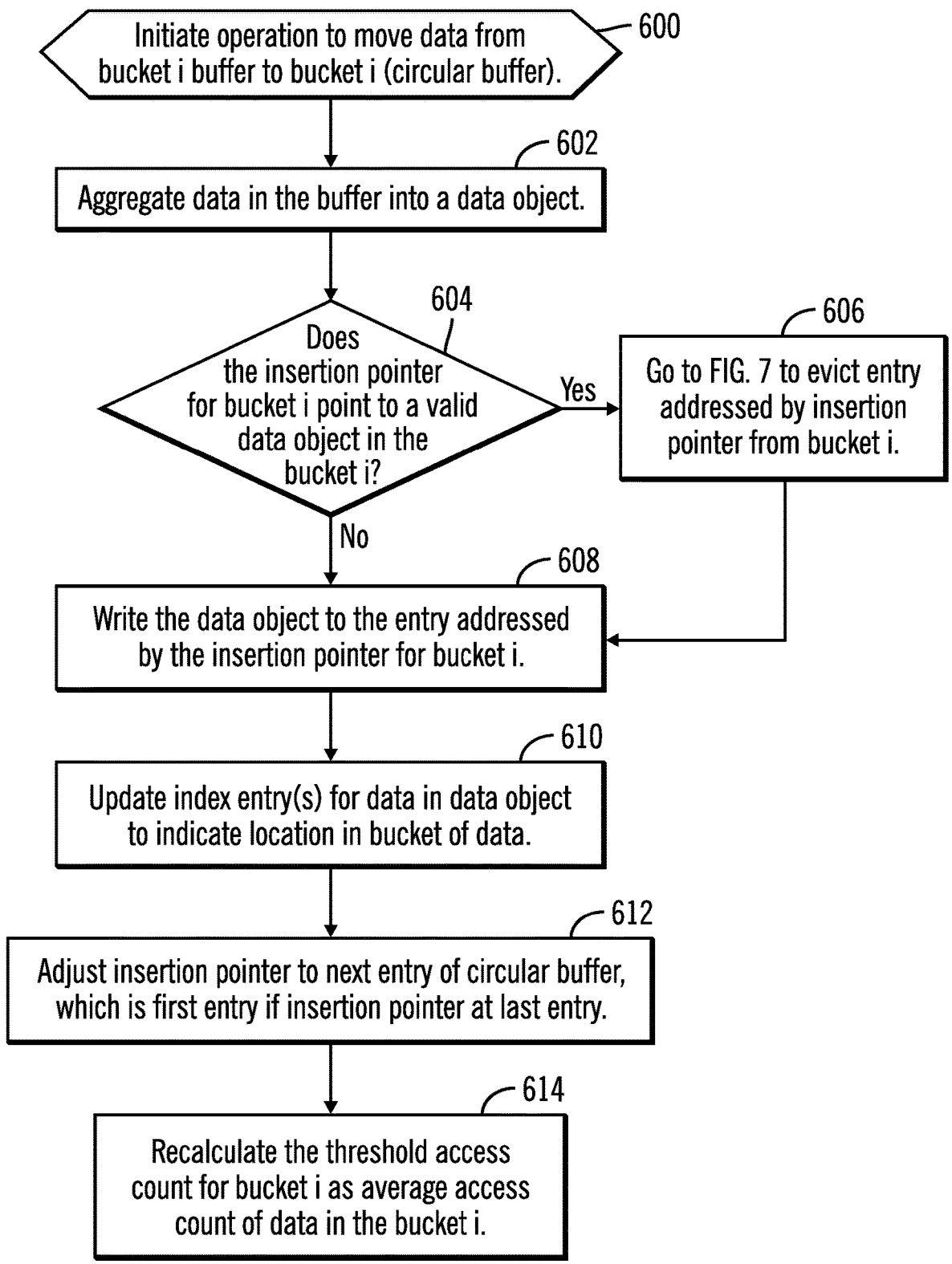
FIG. 6 illustrates an embodiment of operations to move data from a bucket buffer to a bucket circular buffer.

FIG. 6 illustrates an embodiment of operations performed by the integrated cache manager 114 move data from a bucket buffer $120_i$ to the corresponding bucket $118_i$ to free space in the buffer $120_i$ for new data coming in from the first level memory 116 or another bucket. Data in the buffer $120_i$ is aggregated (at block 602) into a data object to optimize the amount of data written into a circular buffer $402_i$ of the bucket $400_i$. The optimal amount of data may comprise an amount of data that optimizes the garbage collection process involved in the write operation. If (at block 604) the insertion pointer $406_1$ for bucket $400_i$ points to a valid data object in the circular buffer $402_1$ of bucket $400_1$, having all valid data, then control proceeds (at block 606) to FIG. 7 to evict the data at the entry addressed by the insertion pointer $406_i$ from the bucket $400_i$. After evicting the data at the insertion pointer $406_i$ or if the insertion pointer $406_i$ does not point to a valid data object, e.g., having a bucket valid flag 208 set to valid or points to an empty entry, then the data in the aggregated data object is sequentially written (at block 608) to the entry addressed by the insertion pointer $406_i$. The index entries $300_j$ for data in the written data object are updated (at block 610) to indicate the location 204 in the bucket $400_i$, such as the entry in the circular buffer $402_i$ at which the data is written. The insertion pointer $406_i$ is adjusted (at block 612) to point to the next entry in the circular buffer $402_i$, which may comprise the first entry in the circular buffer $402_i$ if the insertion pointer $406_i$ is at the last entry. The threshold access count 308 for the bucket $400_i$ may be recalculated (at block 614) as the average of the access counts 206 of the data in the bucket $400_i$.

With the embodiment of FIG. 6, data in the buffer $120_i$ is consolidated into a data object to sequentially write at the insertion pointer 306 of the circular buffer for the bucket $118_i$ to free space in the buffer $120_i$ for more data to write to the buffer $120_i$. This optimizes the storage of smaller random writes in the bucket memories, by aggregating to allow a faster sequential write of data to locations in the bucket $118_i$ memory.

Figure 7:
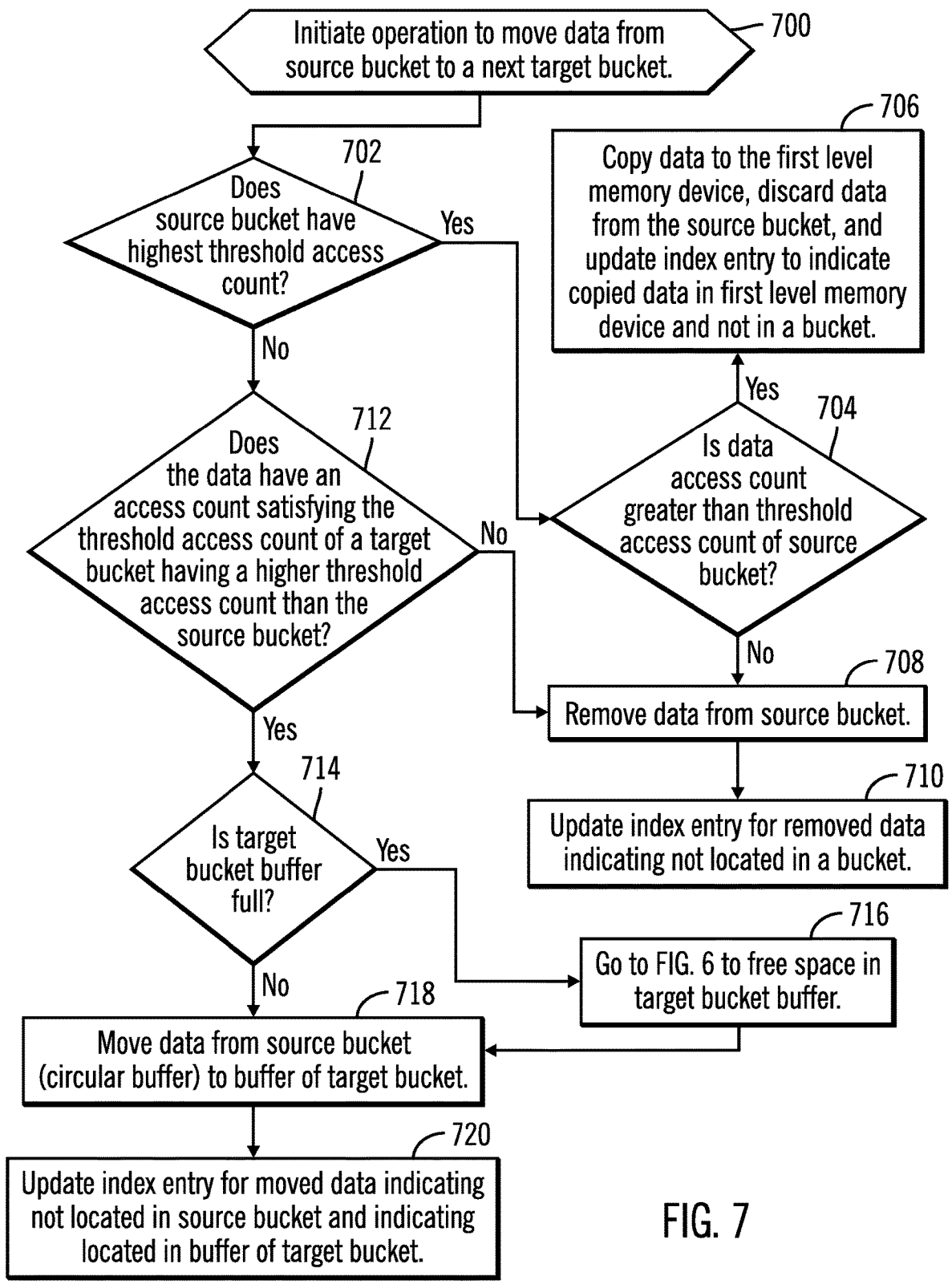
FIG. 7 illustrates an embodiment of operations to move data from a source bucket to a target bucket.

FIG. 7 illustrates an embodiment of operations performed by the integrated cache manager 114 to move data from a source bucket $118_S$ to a target bucket $118_T$, such as when making room in the source bucket $118_S$ to accommodate more data. Upon initiating the move operation (at block 700), if (at block 702) the source bucket $118_S$ has the highest threshold access 308, i.e., the hottest or most accessed data, then a determination is made (at block 704) if the data access count 206 is greater than the threshold access count 308 for the source bucket $118_S$. If so, then the data is copied (at block 706) to the first level memory device 116, discarded from the source bucket $118_S$, and the location field 204 in the index entry $200_i$ for the copied data is updated to indicate the copied data is in the first level memory device 116 and not in a bucket.

If (at block 704) the data access count 206 is less than the threshold access count 308 of the source bucket $118_S$, then the data is removed (at block 708) from the source bucket $118_S$ and the index entry $200_i$ is updated (at block 710) for the removed data indicating in location field 204 that the data is not located in the source bucket $118_S$. In an alternative embodiment, instead of automatically removing the data from the source bucket $118_S$, a determination may be made of a bucket having a lower threshold access count 308 in which the data to remove may exceed, to then move the data from the source bucket $118_S$ to a target bucket $118_T$ having a lower threshold access count 308, i.e., for less frequently accessed data.

If (at block 702) the source bucket $118_S$ does not have the highest threshold access count 308 of all buckets, then a determination is made (at block 712) whether the data has an access count 206 that satisfies the threshold access count 308 of a target bucket $118_T$ having a higher threshold access count 308 than that of the source bucket $118_S$. This would require the target bucket $118_T$ have a threshold access range, from the threshold access count 308 of the target bucket $118_T$ to the threshold access count 308 of a next hotter bucket $118_{T+1}$ that includes the data access count 206. The target bucket $118_T$ may always comprise the bucket having the first threshold access count 308 greater than the threshold access count 308 of the source bucket $118_S$. Alternatively, the target bucket $118_T$ may have the highest threshold access count 308 that the data access count 206 exceeds, which may not be the next bucket following the source bucket $118_S$. If (at block 712) there is no bucket with a higher threshold access count than the source bucket $118_S$ in which the data access count 308 may be included, then control proceeds to block 708 to remove the data from the source bucket $118_S$ and discard without moving to another hotter bucket.

If (at block 712) there is a target bucket $118_T$ in which the data may be included, then if (at block 714) the target bucket buffer $120_T$ is full, then control proceeds (at block 716) to FIG. 6 to free space in the target bucket buffer $120_T$. If (at block 714) the target bucket buffer $120_T$ is not full or after freeing space in the target bucket buffer $120_T$ (at block 716), then the data is moved (at block 718) from the source bucket $118_S$ circular buffer to the buffer $120_T$ of the target bucket $118_T$. Moving the data involves discarding from the source bucket $118_S$. The location 204 in the index entry $200_i$ for the moved data is updated (at block 720) to indicate the data is not located in the source bucket $118_S$ and indicates the location in the buffer $120_T$ of the target bucket $118_T$ at which the data is now located.

The embodiment of FIG. 7 moves data from a source bucket to a target bucket having a higher threshold access range, i.e., a hotter bucket, if the data satisfies the threshold access count of the target bucket. This allows space to be freed from the source bucket to make room for more data and allows the data removed from the source bucket to free space to be retained in a target bucket from which the data can be retrieved and moved to the first level memory 116, which has much lower latency than the storage 110.

Figure 8:
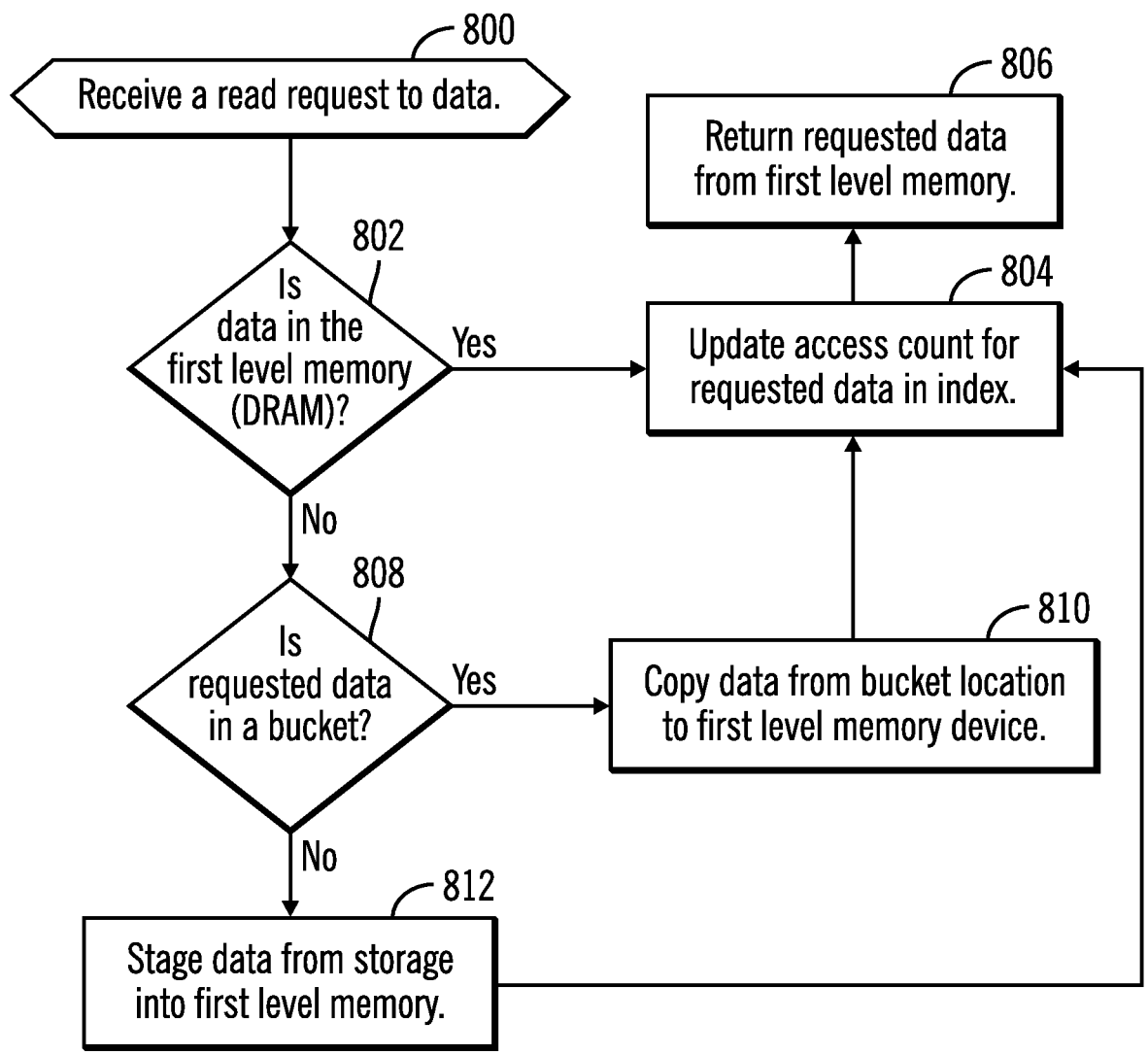
FIG. 8 illustrates an embodiment of operations to process a read request to data.

FIG. 8 illustrates an embodiment of operations performed by the integrated cache manager 114 to process a read request to data. Upon receiving (at block 800) a read request from a host 102, if (at block 802) the requested data is in the first level memory 116, the access count 206 for the requested data in the index entry $200_i$ for the requested data is incremented (at block 804). The requested data is returned (at block 806) to the requesting host 102 from the first level memory 116. If (at block 802) the requested data is not in the first level memory 116 and the requested data is in a bucket $118_i$, then the requested data is copied (at block 810) from the bucket location 304 to the first level memory device 116 and control proceeds to block 804 to return the data. In certain embodiments, the requested read data elevated to the first level memory 116 remains in the bucket $118_i$. If (at block 808) the requested data is not in a bucket $118_i$, then the requested data is staged from the storage 110 into the first level memory 116 and control proceeds to block 804 to return the requested data to the host 102.

With the embodiment of FIG. 8, read requests may be returned from the first level memory 116 or one of the buckets $118_i$ if a copy of the data is retained in a bucket. This allows returning data from the lowest latency type device before data is returned from storage 110, which has the highest latency.

Figure 9:
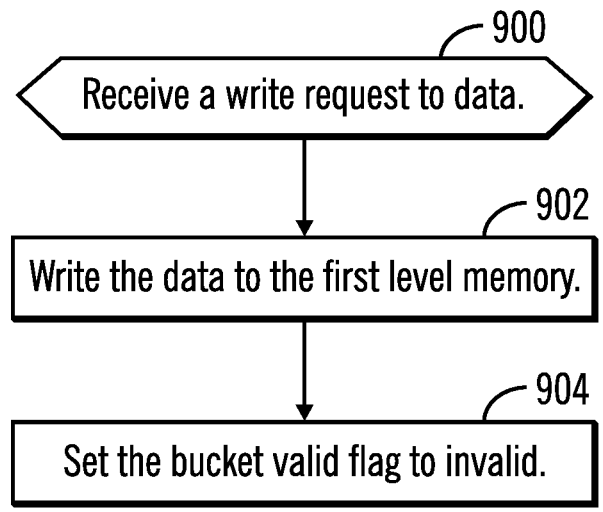
FIG. 9 illustrates an embodiment of operations to process a write request to data.

FIG. 9 illustrates an embodiment of operations performed by the integrated cache manager 114 to process a write request with write data. Upon receiving (at block 900) a write request from a host 102, the data is written (at block 902) to the first level memory 116. The bucket valid flag 208 is set (at block 904) to indicate the data in the bucket $118_i$ is invalid. Indicating the data as invalid in a bucket will allow the data in the bucket to be overwritten and reused when the insertion pointer reaches the data in the bucket.

Figure 10:
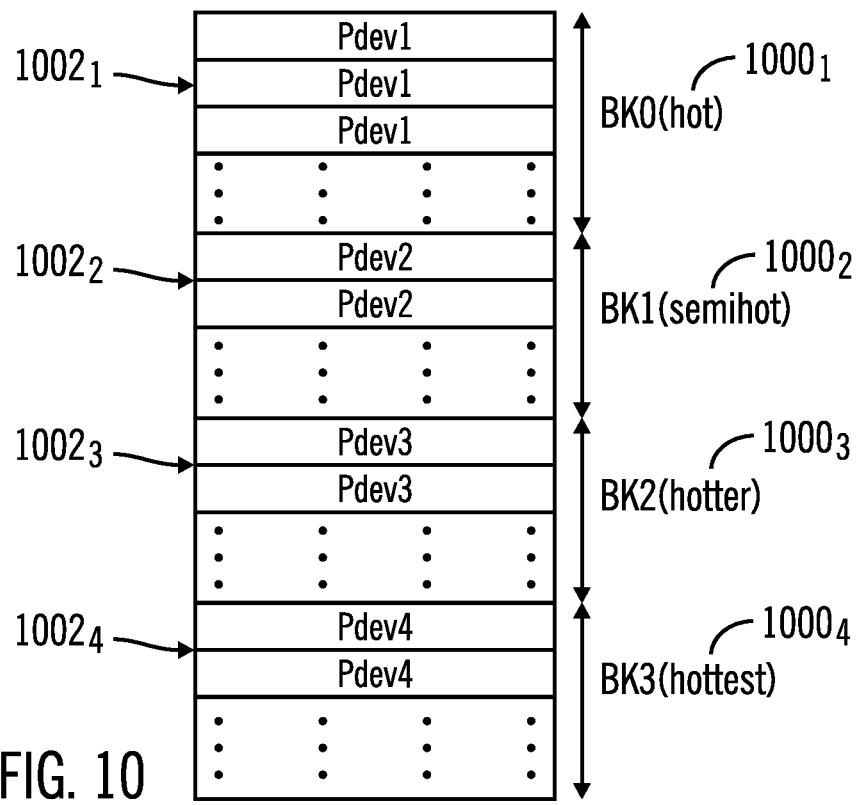
FIG. 10 illustrates an embodiment of buckets that map to separate memory devices.

FIG. 10 illustrates an implementation where the buckets are implemented in separate physical devices (Pdevs). Four buckets $1000_1$, $1000_2$, $1000_3$, $1000_4$ are shown and each bucket is shown implemented in separate physical devices (Pdevs) $1002_1$, $1002_2$, $1002_3$, $1002_4$, respectively. In the embodiment of FIG. 10, the bucket boundaries align with the physical devices $1002_1$, $1002_2$, $1002_3$, $1002_4$.

Figure 11:
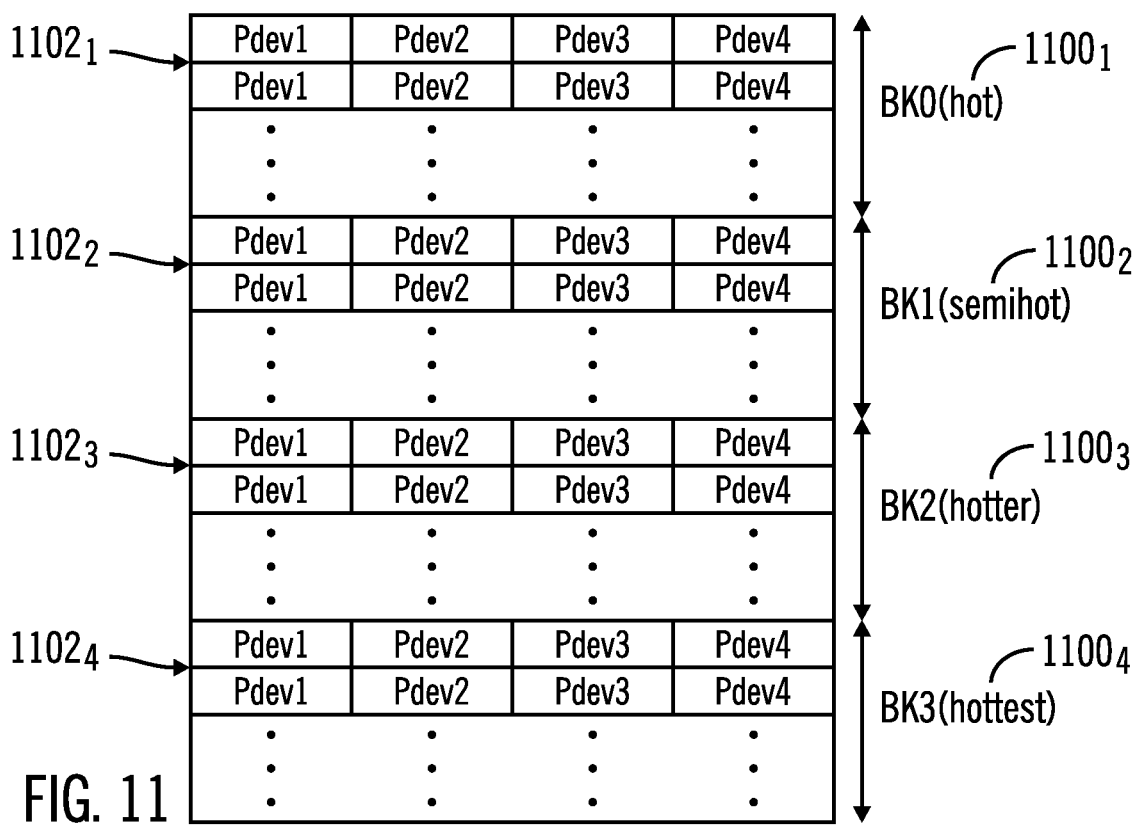
FIG. 11 illustrates an embodiment of buckets that map to interleaved blocks in different memory devices.

FIG. 11 illustrates an implementation where the buckets comprise blocks that are interleaved in different physical devices (Pdevs). Four buckets $1100_1$, $1100_2$, $1100_3$, $1100_4$ are shown as having an address space comprised of blocks $1102_1$, $1102_2$, $1102_3$, $1102_4$ in the four different physical devices Pdev1, Pdev2, Pdev3, and Pdev4. With the embodiment of FIG. 11, multiple physical devices are combined into a single virtual device where each virtual block/address maps to a physical block in a physical device (Pdev) identified by physical device, device offset, and block size. In this way, the virtual cache, comprised of the physical devices (Pdev1, Pdev2, Pdev3, Pdev4), is subdivided into the buckets $1100_1$, $1100_2$, $1100_3$, $1100_4$ having various heat thresholds. In the embodiment of FIG. 11, the data for each bucket maps to interleaved blocks $1102_1$, $1102_2$, $1102_3$, $1102_4$ in the physical devices so that the bucket is implemented in blocks of multiple physical devices.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
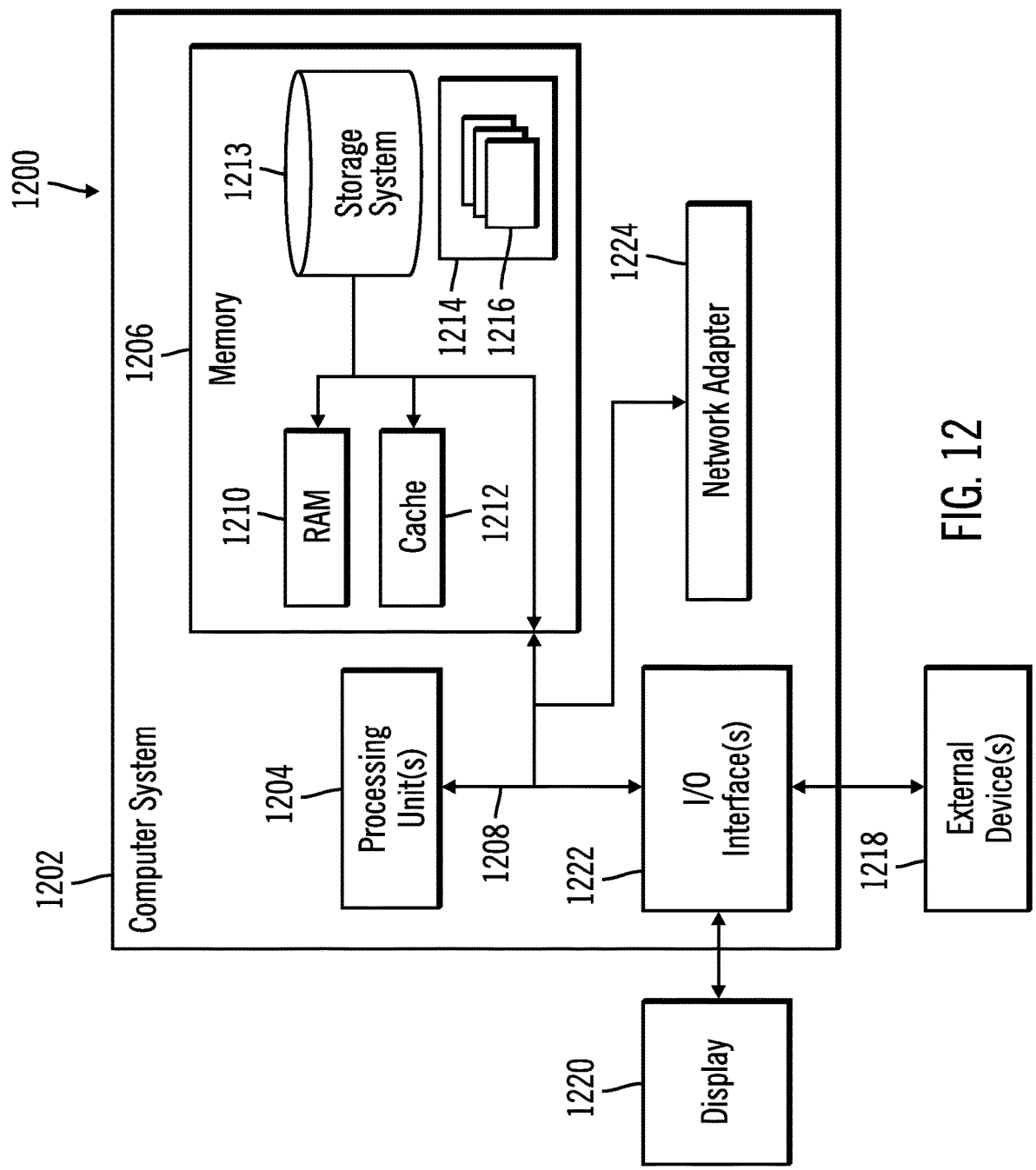
FIG. 12 illustrates a computing environment in which the components of FIG. 1 may be implemented.

The computational components of FIG. 1, including the hosts 102, cache controller 104, and storage controller 105, may be implemented in one or more computer systems, such as the computer system 1202 shown in FIG. 12. Computer system/server 1202 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1202 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, the computer system/server 1202 is shown in the form of a general-purpose computing device. The components of computer system/server 1202 may include, but are not limited to, one or more processors or processing units 1204, a system memory 1206, and a bus 1208 that couples various system components including system memory 1206 to processor 1204. Bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1202 typically includes a variety of computer system readable media. Such media may be any available media that is accessible by computer system/server 1202, and it includes both volatile and non-volatile media, removable and non-removable media.

System memory 1206 can include computer system readable media in the form of volatile memory, such as random access memory (RAM) 1210 and/or cache memory 1212. Computer system/server 1202 may further include other removable/non-removable, volatile/non-volatile computer system storage media. By way of example only, storage system 1213 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1208 by one or more data media interfaces. As will be further depicted and described below, memory 1206 may include at least one program product having a set (e.g., at least one) of program modules that are configured to carry out the functions of embodiments of the invention.

Program/utility 1214, having a set (at least one) of program modules 1216, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. The components of the computer 1202 may be implemented as program modules 1216 which generally carry out the functions and/or methodologies of embodiments of the invention as described herein. The systems of FIG. 1 may be implemented in one or more computer systems 1202, where if they are implemented in multiple computer systems 1202, then the computer systems may communicate over a network.

Computer system/server 1202 may also communicate with one or more external devices 1218 such as a keyboard, a pointing device, a display 1220, etc.; one or more devices that enable a user to interact with computer system/server 1202; and/or any devices (e.g., network card, modem, etc.) that enable computer system/server 1202 to communicate with one or more other computing devices. Such communication can occur via Input/Output (I/O) interfaces 1222. Still yet, computer system/server 1202 can communicate with one or more networks such as a local area network (LAN), a general wide area network (WAN), and/or a public network (e.g., the Internet) via network adapter 1224. As depicted, network adapter 1224 communicates with the other components of computer system/server 1202 via bus 1208. It should be understood that although not shown, other hardware and/or software components could be used in conjunction with computer system/server 1202. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing data in memory devices in a computing system that is stored in a storage device, the computer program product comprising a computer readable storage medium having computer readable program code embodied therein that when executed performs operations, the operations comprising:

maintaining a plurality of buckets representing distinct regions of memory devices wherein the buckets are associated with different threshold access count ranges, wherein data having an access count is stored in one of the buckets associated with a threshold access count range including the access count of the data to store;

copying data evicted from a first level memory device to an initial bucket comprising one of the buckets, wherein the first level memory device and the memory devices cache data stored in the storage device; and moving data from a source bucket comprising one of the buckets, including the initial bucket, to a target bucket of the buckets having a target threshold access count range including an access count of the data to move.

2. The computer program product of claim 1, wherein buffers are associated with the buckets, wherein the buffers are implemented in separate memory devices from the buckets, and wherein the copying the evicted data to a bucket comprises:

buffering the evicted data in a buffer associated with the initial bucket; and aggregating data in the buffer, including the evicted data, in a data object, wherein the copying the evicted data to the initial bucket comprises copying the data object from the buffer for the initial bucket to the initial bucket.

3. The computer program product of claim 1, wherein buffers are associated with the buckets, wherein the moving the data from the source bucket to the target bucket comprises:

copying data from the source bucket to a target buffer associated with the target bucket; and copying a data object comprising data in the target buffer, including the moved data, to the target bucket.

4. The computer program product of claim 1, wherein a plurality of the buckets are organized as circular buffers, each having a pointer to a position in a circular buffer to which data was last written, wherein the moved data comprises data at a pointer to a position in a source circular buffer comprising the source bucket that is about to be overwritten with new data, and wherein the moved data is written to a position in a target circular buffer comprising the target bucket.

5. The computer program product of claim 1, wherein the operations further comprise:

selecting the data to move from the source bucket to make room for data being added to the source bucket from the first level memory device or another bucket; and deleting the selected data from the source bucket without moving the selected data to the target bucket in response to an access count for the selected data not being within the target threshold access count range.

6. The computer program product of claim 1, wherein there are at least three buckets, wherein the target threshold access count range is a lowest threshold access count range of the buckets that is greater than a source threshold access count range of the source bucket.

7. The computer program product of claim 1, wherein there are at least three buckets, wherein the access count of the moved data is included in the target threshold access count range, and wherein the target threshold access count range is not a lowest threshold access count range of the target threshold access count ranges that are greater than a source threshold access range of the source bucket.

8. The computer program product of claim 1, wherein the operations further comprise:

receiving a read request or write request directed to data stored in one of buckets;

in response to the read request, performing:
copying requested data for the read request from a bucket to the first level memory device while maintaining the requested data in a bucket having the requested data; and
updating an access count number for the requested data indicating an access count of the requested data; and in response to the write request, performing:
writing updated data for the write request to the first level memory device; and
indicating the updated data in the bucket as invalid.

9. The computer program product of claim 1, wherein the operations further comprise:

maintaining an index having index entries for data stored in at least one of the first level memory device and one of the buckets, wherein an index entry of the index entries indicates a location of data in a bucket, an access count indicating a number of times the data was accessed while in the buckets, and a valid flag indicating whether the data in the bucket is valid.

10. The computer program product of claim 1, wherein a plurality of the buckets are comprised of different physical memory devices.

11. The computer program product of claim 1, wherein multiple physical memory devices are configured as a single virtual device such that data for a plurality of the buckets is striped across interleaving blocks of the multiple physical memory devices assigned to the buckets including the data.

12. An integrated cache manager for managing data in memory devices in a computing system that is stored in a storage device by performing:

maintaining a plurality of buckets representing distinct regions of memory devices wherein the buckets are associated with different threshold access count ranges, wherein data having an access count is stored in one of the buckets associated with a threshold access count range including the access count of the data to store;

copying data evicted from a first level memory device to an initial bucket comprising one of the buckets, wherein the first level memory device and the memory devices cache data stored in the storage device; and moving data from a source bucket comprising one of the buckets, including the initial bucket, to a target bucket of the buckets having a target threshold access count range including an access count of the data to move.

13. The integrated cache manager of claim 12, wherein buffers are associated with the buckets, wherein the buffers are implemented in separate memory devices from the buckets, and wherein the copying the evicted data to a bucket comprises:

buffering the evicted data in a buffer associated with the initial bucket; and aggregating data in the buffer, including the evicted data, in a data object, wherein the copying the evicted data to the initial bucket comprises copying the data object from the buffer for the initial bucket to the initial bucket.

14. The integrated cache manager of claim 12, wherein buffers are associated with the buckets, wherein the moving the data from the source bucket to the target bucket comprises:

copying data from the source bucket to a target buffer associated with the target bucket; and copying a data object comprising data in the target buffer, including the moved data, to the target bucket.

15. The integrated cache manager of claim 12, further performing:
 selecting the data to move from the source bucket to make room for data being added to the source bucket from the first level memory device or another bucket; and
 deleting the selected data from the source bucket without moving the selected data to the target bucket in response to an access count for the selected data not being within the target threshold access count range.

16. The integrated cache manager of claim 12, further performing:
 receiving a read request or write request directed to data stored in one of buckets;
 in response to the read request, performing:
  copying requested data for the read request from a bucket to the first level memory device while maintaining the requested data in a bucket having the requested data; and
  updating an access count number for the requested data indicating a access count of the requested data; and
 in response to the write request, performing:
  writing updated data for the write request to the first level memory device; and
  indicating the updated data in the bucket as invalid.

17. A method for managing data in memory devices in a computing system, comprising:
 maintaining a plurality of buckets representing distinct regions of memory devices wherein the buckets are associated with different threshold access count ranges, wherein data having an access count is stored in one of the buckets associated with a threshold access count range including the access count of the data to store;
 copying data evicted from a first level memory device to an initial bucket comprising one of the buckets, wherein the first level memory device and the memory devices cache data stored in a storage device; and
 moving data from a source bucket comprising one of the buckets, including the initial bucket, to a target bucket of the buckets having a target threshold access count range including an access count of the data to move.

18. The method of claim 17, wherein buffers are associated with the buckets, wherein the buffers are implemented in separate memory devices from the buckets, and wherein the copying the evicted data to a bucket comprises:
 buffering the evicted data in a buffer associated with the initial bucket; and
 aggregating data in the buffer, including the evicted data, in a data object, wherein the copying the evicted data to the initial bucket comprises copying the data object from the buffer for the initial bucket to the initial bucket.

19. The method of claim 17, wherein buffers are associated with the buckets, wherein the moving the data from the source bucket to the target bucket comprises:
 copying data from the source bucket to a target buffer associated with the target bucket; and
 copying a data object comprising data in the target buffer, including the moved data, to the target bucket.

20. The method of claim 17, further comprising:
 selecting the data to move from the source bucket to make room for data being added to the source bucket from the first level memory device or another bucket; and
 deleting the selected data from the source bucket without moving the selected data to the target bucket in response to an access count for the selected data not being within the target threshold access count range.

* * * * *